United States Patent [19]

Goforth et al.

[11] Patent Number: 5,096,046

[45] Date of Patent: Mar. 17, 1992

[54] SYSTEM AND PROCESS FOR MAKING SYNTHETIC WOOD PRODUCTS FROM RECYCLED MATERIALS

[75] Inventors: Billy D. Goforth, Fayetteville; Charles L. Goforth, Lowell, both of Ark.; Joe G. Brooks, Junction, Tex.

[73] Assignee: Advanced Environmental Recycling Technologies, Inc., Springdale, Ark.

[21] Appl. No.: 530,839

[22] Filed: May 30, 1990

Related U.S. Application Data

[62] Division of Ser. No. 491,061, Mar. 14, 1990.

[51] Int. Cl.⁵ .............................................. A65G 15/14
[52] U.S. Cl. .................... 198/604; 193/35 R; 198/782; 198/620
[58] Field of Search ............... 198/580, 604, 605, 614, 198/464.2, 468.11, 782, 620; 193/35 R, 35 B

[56] References Cited

U.S. PATENT DOCUMENTS

| | | | |
|---|---|---|---|
| 2,490,381 | 12/1949 | Shields | 198/604 X |
| 3,642,158 | 2/1972 | Koennecke et al. | 198/605 X |
| 3,866,640 | 2/1975 | Sweet et al. | 198/604 X |
| 3,904,022 | 9/1975 | Lutz | 198/614 X |
| 3,978,974 | 9/1976 | Morrissey et al. | 198/782 |
| 4,146,083 | 3/1979 | Scheurecker et al. | 193/35 R X |
| 4,313,488 | 2/1982 | Reymont | 193/35 R X |
| 4,754,867 | 7/1988 | De Anda | 198/464.2 |

FOREIGN PATENT DOCUMENTS

| | | | |
|---|---|---|---|
| 2105500 | 8/1972 | Fed. Rep. of Germany | 193/35 B |
| 2711132 | 9/1978 | Fed. Rep. of Germany | 198/468.11 |
| 3740450 | 6/1989 | Fed. Rep. of Germany | 198/604 |
| 0017407 | 1/1984 | Japan | 193/35 R |
| 0891545 | 12/1981 | U.S.S.R. | 198/782 |

Primary Examiner—Robert P. Olszewski
Assistant Examiner—James R. Bidwell
Attorney, Agent, or Firm—Ross, Howison, Clapp & Korn

[57] ABSTRACT

A process for making synthetic wood products from waste wood fiber and recycled plastic material by mixing waste wood fiber having a moisture content of less than about 15% with dry waste plastic material, including low density and/or high density polyethylene; heating and kneading the mixture to form a homogeneous mass; sizing the mass into discrete chunks suitable for use as an extruder feed material; extruding the material to form products having predetermined cross sections; and rolling and cooling the product to prevent deformation of the product shape.

4 Claims, 8 Drawing Sheets

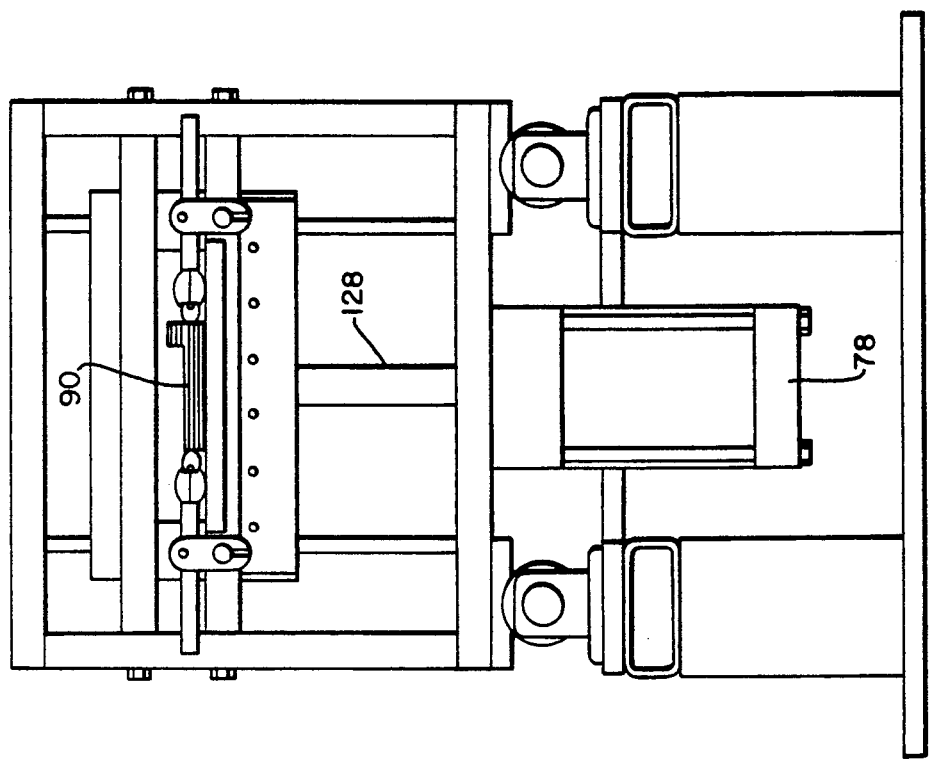
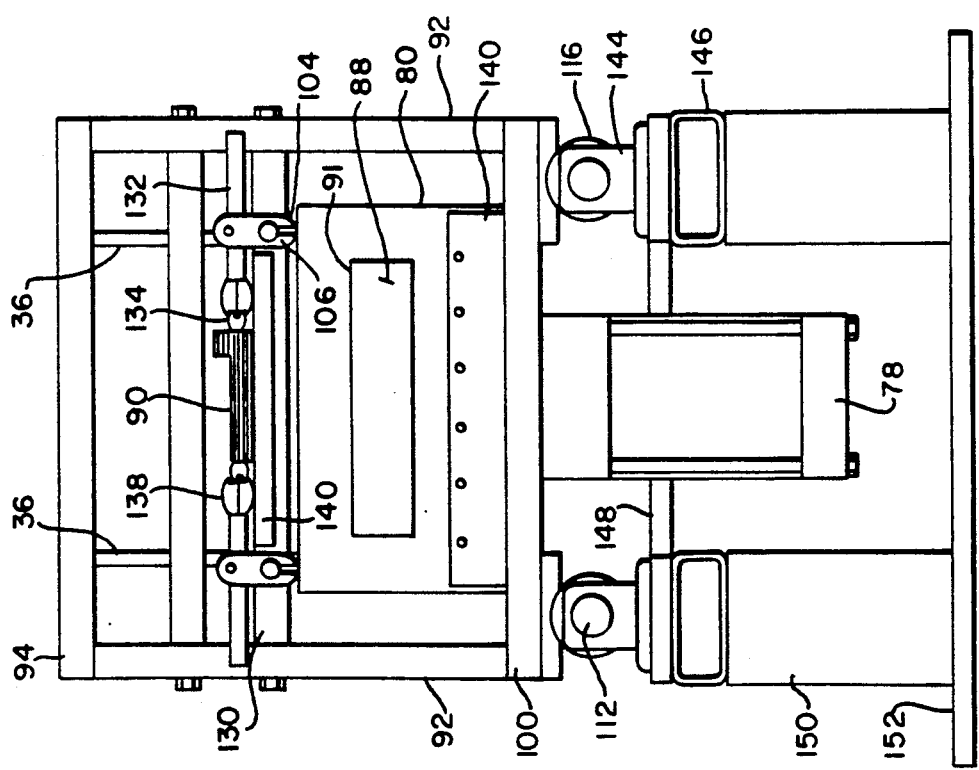

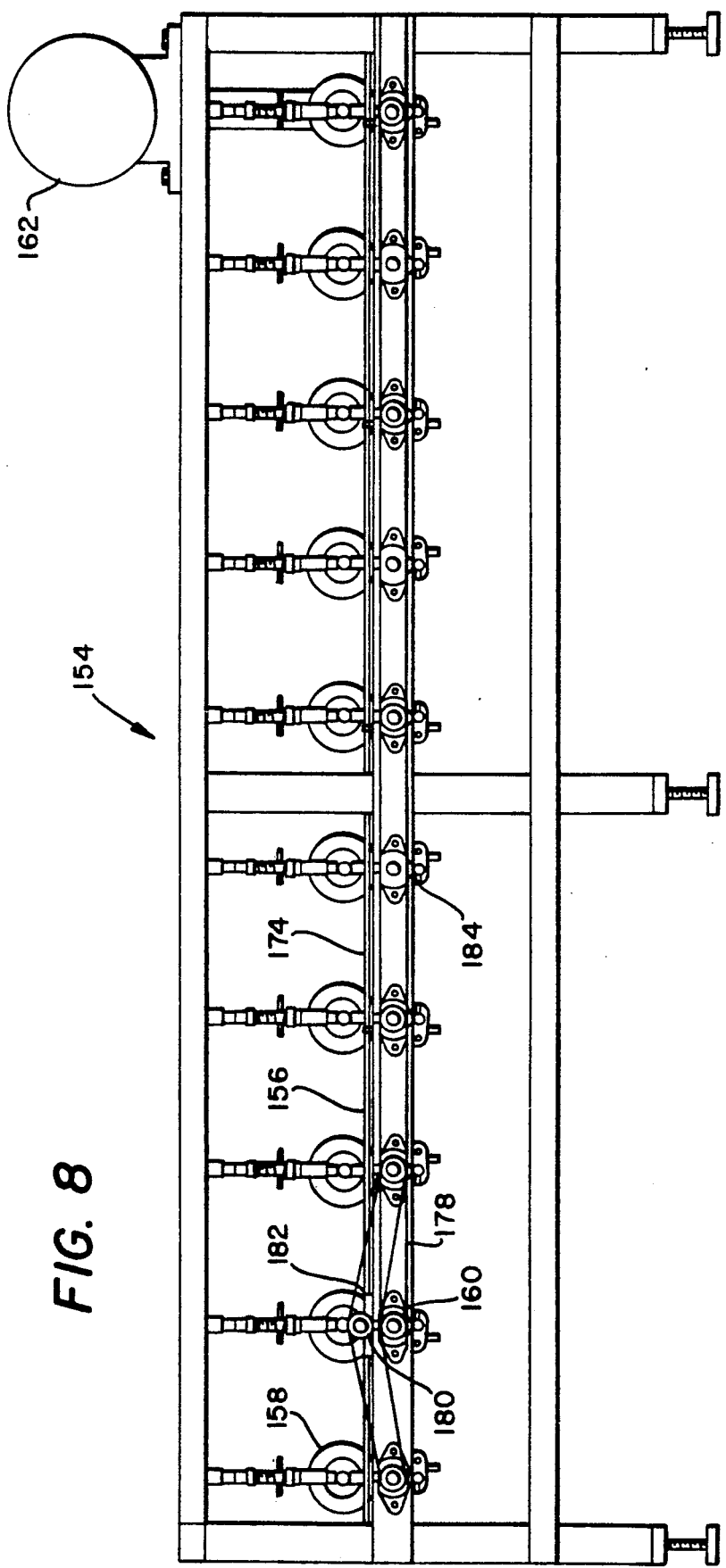

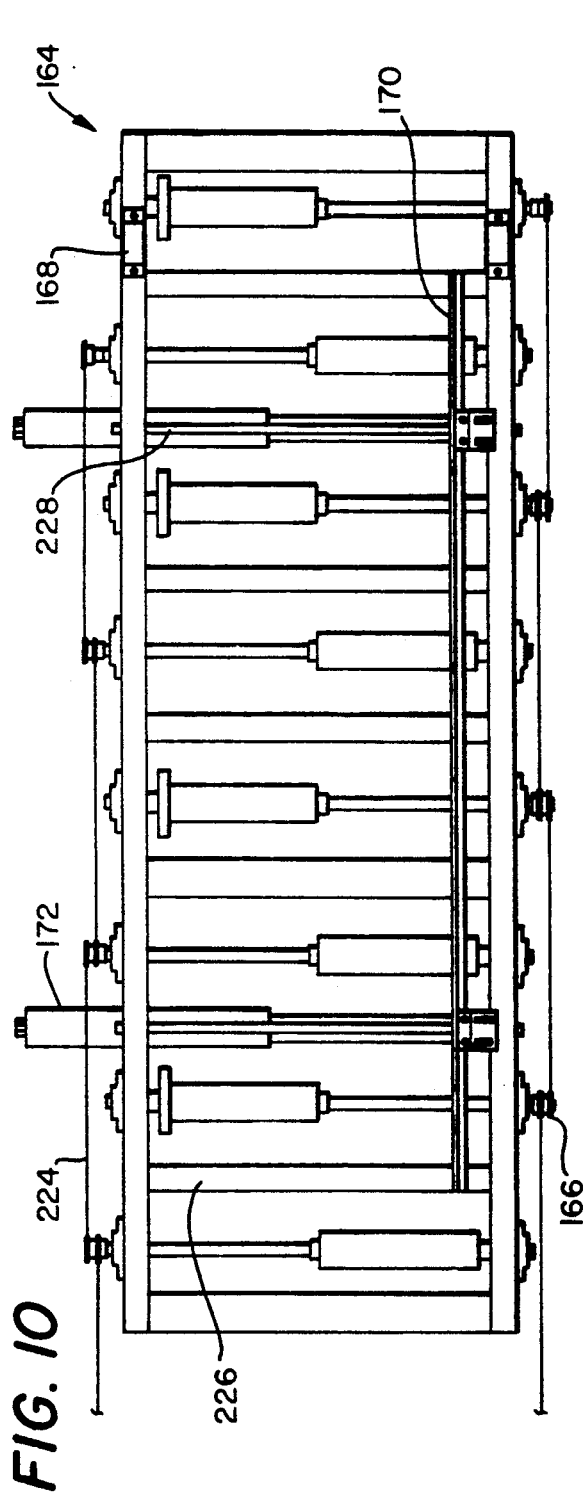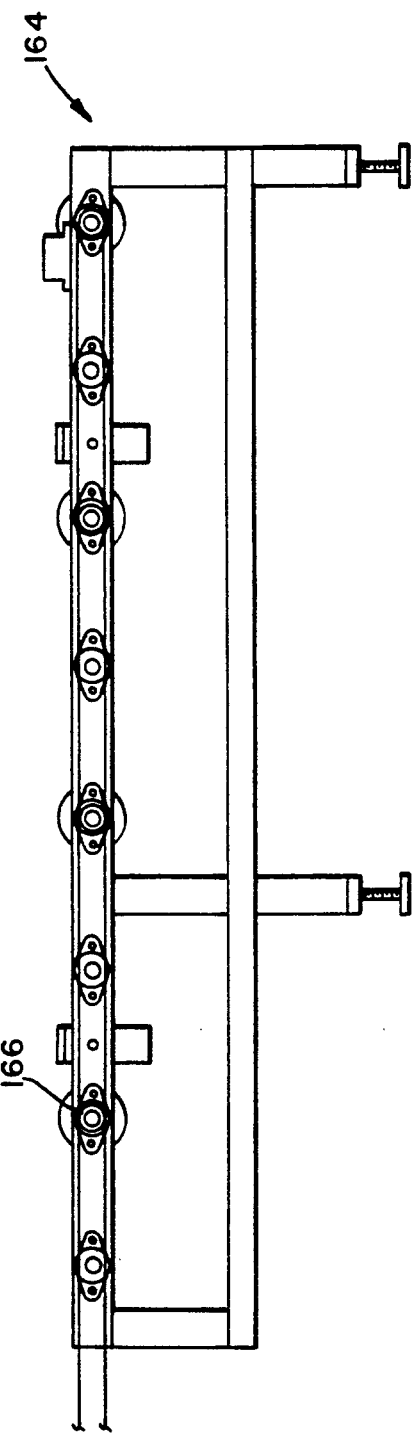
FIG. 10
FIG. 11

SYSTEM AND PROCESS FOR MAKING SYNTHETIC WOOD PRODUCTS FROM RECYCLED MATERIALS

CROSS-REFERENCE TO RELATED APPLICATION

This application is a divisional of application Ser. No. 07/491,061, filed Nov. 14, 1990 pending.

BACKGROUND OF THE INVENTION

1. Field of the Invention

This invention pertains to a system and process for making synthetic wood products, such as building materials, including roof shingles, siding, floor tiles, paneling, moldings, structural components, steps, door and window sills and sashes; house and garden items, such as planters, flower pots, landscape tiles, decking, outdoor furniture, fencing, and playground equipment; farm and ranch items, including pasture fencing, posts and barn components; and marine items, for example, decking, bulkheads and pilings, through a process which combines certain wood scrap material, such as cedar fiber waste, and plastic waste materials, such as high density polyethylene, low density polyethylene, polypropylene and mixtures thereof, and equivalent materials.

The starting wood and plastic materials are identified, processed, mixed, and then formed into building material products through use of an extruder and subsequent rolling processes to produce products which have advantages over natural wood and over other synthetic materials, such that products of the present invention are ordinarily less expensive; have excellent insulating properties; are highly resistant to insect infestation, rotting, splitting, cracking, warping, thermal expansion or absorption of moisture; can be easily shaped and machined; and, in many cases, have superior structural integrity.

2. Needs to Which the Present Invention is Directed

By current estimate, the United States generates half of the world's solid and industrial waste. By the year 2000, if present tends continue, the United States will be discarding 192.7 million tons per year. Only about 22% of this waste is projected to be recycled. Landfills are utilized for the disposal of much of this waste. The United States Environmental Protection Agency (EPA) estimates that by the year 2000, 75% of all existing landfills in the United States will be closed.

According to EPA statistics, discarded plastic presently constitutes about 7.3 percent of the U.S. waste stream. Only about 1% of this plastic waste is recycled. By the year 2000, production of plastics in the U.S. is expected to reach 76 billion pounds per year, with discarded plastics expected to make up 10% of the waste stream by weight and up to ⅓ by volume.

There is clearly a pressing need to adopt means by which plastics and other solid waste materials such as wood fiber waste can be recycled into new and useful products. The present invention meets such need.

3. State of the Art Prior to the Present Invention

There have been developed numerous methods for combining waste wood materials and binders. Examples of such methods can be found in the practice of pressboard and extrusion moulding technologies. However, it has been observed that these methods are limited in the raw materials that can be utilized and in the quality and application of the products produced.

BRIEF DESCRIPTION OF DRAWINGS

FIG. 6 is a downstream end view of the FIG. 5 assembly with the knife of the flying cutoff in the down position.

FIG. 7 is a downstream end view of the FIG. 5 assembly with the knife of the flying cutoff in the up position.

FIG. 8 is a side view of the preferred rolling and cooling conveyor of the present invention.

FIG. 10 is a top view of the FIG. 8 conveyor.

FIG. 11 is a side view of the FIG. 8 conveyor.

SUMMARY OF THE INVENTION

Figure 1:
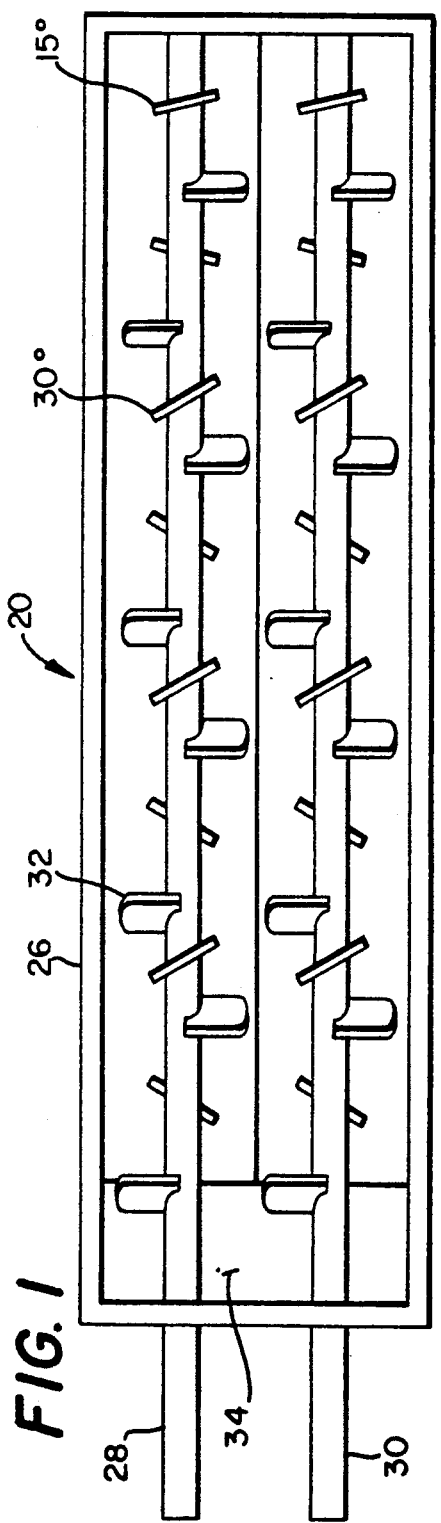
FIG. 1 is a top view of the preferred material preparation auger of the present invention.

The present invention allows for the utilization of a wide range of raw materials, previously considered economically and technically unfeasible, to produce various products made from recycled materials and which are of acceptable quality for numerous end uses. Furthermore, in many instances, the present invention makes possible the creation of a multiplicity of products with attributes superior to those of conventionally manufactured products.

By the present invention, wood fiber is identified, decontaminated, sized and dried, as appropriate, to achieve a moisture content of less than about 15% by weight. Also, waste plastic material, such as HDPE and LDPE, is identified, cleaned and dried.

The wood fiber is then mixed with the waste plastic material in a range of ratios from about 40% plastic/60% fiber to about 60% plastic/40% fiber by weight, with a 45% plastic/55% fiber mix preferred. The plastic component of the mix may be 100% of one type of plastic or may be a controlled blend of plastics, such as 60% LDPE/40% HDPE by weight blend.

The mix is then mixed, heated and kneaded to a temperature high enough to melt the plastic and enable the melted plastic to encapsulate the wood fiber particles. This temperature is defined as the encapsulation point.

The mix is then fed to a material preparation auger, where it is cut into small chunks suitable for use as a feed to an extruder.

The chunks are then fed to an extruder and formed into a product having various cross sections in accordance with the cross section of a die chosen for use with the extruder. The temperature of the product is maintained by various means.

After extrusion, the product is cut into desired lengths, inspected, rolled, cooled, collected and then either subjected to further processing or assembled for shipment.

DETAILED DESCRIPTION OF PREFERRED EMBODIMENTS

With reference to the general process steps used to produce the synthetic wood products of the present invention, as well as with reference to examples in which specific starting materials and specific processing parameters are set forth, preferred embodiments of the present invention will be described.

In preferred embodiments of the present invention waste wood fiber and waste plastic are reclaimed and processed into various synthetic wood products such as, for example, building materials, including roof shingles, siding, floor tiles, paneling, moldings, structural components, steps, door and window sills and sashes; house and garden items, such as planters, flower pots, landscape tiles, decking, outdoor furniture, fencing and playground equipment; farm and ranch items, including pasture fencing, posts and barn components; and marine items, for example, decking, bulkheads and pilings.

STEP 1

The first step in the process is the identification and collection of wood fiber starting materials, preferably waste wood materials such as cedar fiber. Once identified and collected, the waste wood starting material is placed into a holding bin or storage area.

Although other wood fibers may be used, cedar fiber is the preferred wood fiber for the present invention. Cedar fiber, as envisioned within the scope of the invention, is presently available as a waste product from cedar oil mills. Raw waste from cedar oil mills usually includes cedar fiber contaminated with rocks, metal and relatively large chunks of wood, all of which must be removed from the raw cedar fiber waste prior to placing the desired cedar fiber waste into a holding bin.

In addition to the other wood fibers being usable as a starting material, mixtures of cedar fiber and other wood fibers may be used as a starting material.

STEP 2

Once identified, the cedar fiber raw feed material is processed to remove contaminants. The preferred decontamination equipment includes screens, shakers, separators and magnets to remove various foreign materials such as stones, metal and large pieces of wood.

All of the decontamination equipment envisioned for use in the present invention are conventional and their use is well known for the stated functions.

In addition to using magnets to remove metallic contaminants found in the raw cedar fiber feed material, or other raw wood fiber feed, it is preferred that additional magnets be used at various locations throughout the processing system for the purpose of removing pieces of metal which might break away from processing apparatus or otherwise become a contaminant during processing.

STEP 3

After contaminant removal, the cedar fiber is subjected to conventional grinders, such as hammermills, and vibrating screens in order to produce a processed fiber feed having maximum size characteristics. The preferred maximum diameter of the wood fiber is one-eighth inch, and, thus, screens sized to yield minus one-eighth inch diameter fibers are preferred. Since much of the wood fiber is in the form of slivers, the screens will allow the passage of fibers having lengths greater than the maximum allowed diameter. The preferred fiber length is less than one inch.

STEP 4 (Proposed)

At this point in the process, it is preferred that the cedar fiber have a certain maximum moisture content by weight. For further processing, the moisture content of the cedar fiber should not exceed about 15% by weight and it is preferred that the moisture content of the cedar fiber be less than about 12% by weight.

It has been found that cedar fiber from cedar oil mills typically has about 15% to 30% moisture by weight, although this percentage can be higher, depending on the circumstances of the cedar oil mill processing and weather conditions, such as relative humidity, recent rainfall, etc.

The moisture content of the cedar fiber may be reduced at different times and/or locations. For example, the cedar fiber may be dried at the cedar oil mills prior to delivery to the synthetic wood product manufacturing site. In such event, the cedar fiber is dried by means of a conventional dryer to a moisture content of less then 15% by weight.

However, because cedar fiber, like other wood fiber, is hygroscopic and tends to pick up moisture the more it is handled and the longer it is held after being subjected to a drying procedure, it is envisioned that a preferred drying step take place at this stage of the process.

A conventional, variable speed in-line wood dryer fueled by waste wood chips or other fuel may be used to reduce the moisture content of the cedar fibers. It is envisioned that any conventional equipment may be used so long as the function of effectively reducing the moisture content of the sized cedar fibers, or their equivalent, is accomplished. It is also envisioned that microwave technology may be used to flash steam off from the sized cedar fiber to achieve the desired moisture content reduction.

The objective of reducing moisture content to less than approximately 15% by weight at this step is considered important because it has been discovered that excessive moisture in the cedar fiber material will cause pitting or bubbling in the finished product.

Thus, whatever the identification of the wood product raw feed material is, it is important to reduce the moisture content to a level which will avoid the problems of pitting or bubbling in the finished product.

STEP 5

The sized, and heat treated, as appropriate, cedar fiber is then conveyed by conventional means, such as a bucket elevator, to a conventional holding bin or storage area.

STEP 6

In parallel with the identification and preliminary processing of the wood fiber, a corresponding identification and preliminary processing of waste plastic material is accomplished.

First, waste plastic raw materials are identified, collected and placed into conventional holding bins. Presently, it is envisioned that high density polyethylene (HDPE) and low density polyethylene (LDPE) are the preferred types of waste plastic materials.

HDPE has a density of greater than approximately 0.94 g/cc, measured in accordance with ASTM D1505, and a melt index of less than approximately 1.0 g/10 minutes, measured in accordance with ASTM D1238, Condition 190/2.16. An example of such type material is Marlex polyethylene, resin number EHM 6007, manufactured by Phillips 66, Bartlesville, Okla.

LDPE has a density of less than approximately 0.94 g/cc, measured in accordance with ASTM D1505, and a melt index of greater than approximately 1.0 g/10 minutes, measured in accordance with ASTM D1238, Condition 190/2.16. An example of such type material is Polyethylene 5004 extrusion coating resin manufactured by The Dow Chemical Company, Midland, Mich.

Preferably, the waste plastic materials are segregated into different holding bins according to type.

Numerous sources of waste LDPE and HDPE are available and it is envisioned that waste plastics from any of these sources may be used in the present invention. Also, it is envisioned that other types of plastics may be used within the scope of the present invention. Other plastics which may be considered equivalent for purposes of the present invention are those which can be processed with extrusion equipment of the type disclosed herein and at temperatures which would not adversely affect the wood fiber feed component in terms of producing unacceptable product for a desired end use. Also, of course, any plastic having the appropriate temperature and physical properties must also be relatively inert in that it must be approved for use in environments in which the end product is used, as well as in the manufacturing environment.

Preferred sources of LDPE are floor sweepings from conventional petrochemical plants, commonly referred to as sump LDPE. Sump LDPE is known to have some polypropylene material contaminant mixed in with it and this contaminant has not adversely effected the end products produced with the process of the present invention. Also, "off spec" LDPE purchased as waste product from petrochemical plants is another preferred source of LDPE.

It is envisioned that another source of LDPE will be plastic lining from certain food packaging operations and beverage container operations, as well as other types of plastic coated papers. It is known that the paper in such plastic coated paper items may be recycled through a process in which the paper and plastic are separated from each other, i.e., hydropulping. It has been found that the LDPE resulting from hydropulping is acceptable as a plastic feed material for the current invention so long as the residual paper content is not excessive, that is, does not exceed about 10% by weight.

Preferred sources of HDPE are articles manufactured from HDPE, such as commonly produced containers for milk, distilled water, fruit juices, soft drink concentrates, liquid detergents, bleach, etc. Also, "off spec" HDPE purchased as waste product from petrochemical plants is another preferred source of HDPE.

STEP 7

The raw plastic material feed is then cleaned, if necessary, to remove unwanted foreign or contaminant material. The contamination removal step employs conventional screens, shakers, magnets and washing equipment, as is well known. Even though it is believed that most sources of LDPE and HDPE are essentially contaminant free, it is preferred that, as a precaution, all plastic feed material introduced into the process be subjected to cleaning or contaminant removal.

STEP 8

The cleaned plastic feed material is then dried to remove any residual moisture from the aforementioned washing procedure. The dried plastic feed material preferably has 0% moisture content by weight, however, trace amounts of moisture may remain with the dried plastic feed material without significantly adversely affecting subsequent processing steps. The preferred drying operation is accomplished through conventional use of a conventional, vertical, in-line spin air dryer.

STEP 9

The dried plastic feed material is then conveyed to holding bins and classified into various bins according to each type of plastic feed material.

STEP 10

Treated fiber from Step 5 and treated plastic from Step 9 are then weighed in accordance with a desired, predetermined mix ratio by introducing such fiber and plastic into a hopper equipped with scales for determining the weight of each component. Conventional means, such as screw conveyors or bucket elevators, may be used to convey the wood fiber and plastic material from their holding bins to the hopper.

The preferred ratio of the cedar fiber to plastic in the mix is 45% plastic and 55% fiber, by weight. It has been found that the ranges within which usable product may be achieved are from about 40% plastic and 60% fiber to about 60% plastic and 40% fiber by weight.

The particular mixture of ingredients is chosen as a function of the characteristics of the final product desired, the type of plastic and type of fiber chosen. For example, in a preferred mix formulation, 100% LDPE is used as the 45% plastic component and 100% cedar fiber as the 55% wood component. In another preferred mix formulation, a 60/40 blend by weight of LDPE and HDPE, respectively, is used as the 45% plastic component and 100% cedar fiber as the 55% wood component.

During the step of preparing the mixture, the fiber and plastic may be fed to the hopper in any order. For example, if a 55% fiber to 45% plastic mix is desired, 550 lbs. of fiber could be added to the hopper, then 450 lbs. of plastic could be added, or vice versa.

After the entire weight of fiber and plastic is conveyed to the hopper, then the entire weight, in this example 1000 lbs., would be discharged for further processing in accordance with the present invention.

In this example, if the plastic were totally LDPE, 450 lbs. of LDPE would be added to the hopper. If the plastic were 60% LDPE and 40% HDPE, then 270 lbs. of LDPE and 180 lbs. of HDPE would be added to the hopper.

It has been found that a relatively stronger end product can be produced by inclusion of HDPE in the mix formulation. For example, when the products made with the two preferred mix formulations mentioned above, i.e., the first with 100% LDPE plastic and the second with the 60 LDPE/40 HDPE plastic blend, are compared from the force required to pull a screw from each type, approximately 42% more lbs. force is required to pull a screw out of the product containing HDPE than to pull an identical screw, identically mounted, out of the product containing all LDPE as its plastic component.

STEP 11

After weighing the desired amounts of fiber and plastic to achieve the predetermined mix and total weight desired, the mixture in the hopper is unloaded and discharged into a conventional, cleated belt conveyor to a batch holding bin.

STEP 12

From the holding bin the cedar fiber and plastic mix are gravity fed through a chute into a conventional compounding machine for heating, mixing and kneading. Although numerous conventional machines may be utilized, the preferred compounding machine is a modified sigma blade, double arm mixer which is insulated and jacketed for heating with hot oil up to temperatures of about 500° F.

The processing objectives to be met within the compounding machine are to heat the fiber/plastic mixture to a temperature high enough to melt the plastic and to thoroughly mix the wood fiber with the molten plastic so that the molten plastic will bond with and encapsulate the wood fiber. As mentioned earlier, this temperature is defined as the encapsulation point. This processing step yields a homogeneous mass having the consistency of a ball or lump of sticky cookie dough.

Depending upon the plastic or combination of plastics chosen, the encapsulation point to which the fiber plastic mixture should be raised within the compounding machine will vary. For instance, if the plastic is comprised of only LPDE, the temperature of the fiber/plastic mixture should be raised to approximately 310° F. If the plastic is comprised of 60% LDPE and 40% HDPE, the mixture should be raised to approximately 350° F.

In practice, the oil in the jacket of the compounding machine is heated to within the range of approximately 400° F. to 500° F., preferably 450° F., prior to introduction of the fiber/plastic mixture. Then the fiber/plastic mixture is introduced into the compounding machine and the temperature of the fiber/plastic mixture is monitored until it reached the desired level, at which time the mixture is discharged from the compounding machine.

Because different fiber/plastic mixtures must be heated to different encapsulation points to achieve adequate processing within the compounding machine, processing time within the compounding machine varies. Generally, with all other factors being constant, the higher the encapsulation point, the longer the processing time will be.

STEP 13

After processing in the compounding machine, the bonded fiber/plastic mixture is then conveyed from the compounding machine to a heated mixture holding bin by conventional means such as a cleated belt conveyor.

The holding bin is heated by conventional means and maintains the mixture in a hot, malleable state.

The heated mixture holding bin level can be automatically controlled by conventional means and the temperature of the bin and its mixture is maintained by a conventional hot oil jacket system. The heated mixture holding bin is maintained at a temperature sufficient to keep the material within its proper processing temperature and consistency range. This range will vary depending upon the make-up of the mixture itself. For instance, if the mixture is 55% fiber and 45% plastic, with the fiber being solely cedar fiber and the plastic being solely LDPE, the temperature range is preferably 280° F. to 320° F. If the mixture is 55% fiber and 45% plastic, with the fiber being solely cedar fiber, but with the plastic being a blend of 60 parts LDPE and 40 parts HDPE, the temperature range is preferably 320° F. to 360° F.

If the mixture cools below a certain lower limit, which will vary according to mixture, it will not extrude properly in a subsequent Processing step. Also, the mixture must not be permitted to rise to a temperature above a certain maximum temperature, which will also vary according to the mixture, because the mixture will not extrude properly in a subsequent processing step. For a 55% cedar fiber/45% LDPE mixture, this minimum temperature is approximately 250° F. and the maximum temperature is approximately 350° F. For a 55% cedar fiber/45% plastic blend with 60 parts LDPE and 40 parts HDPE, the minimum temperature is approximately 290° F. and the maximum temperature is approximately 390° F.

STEP 14

Figure 2:
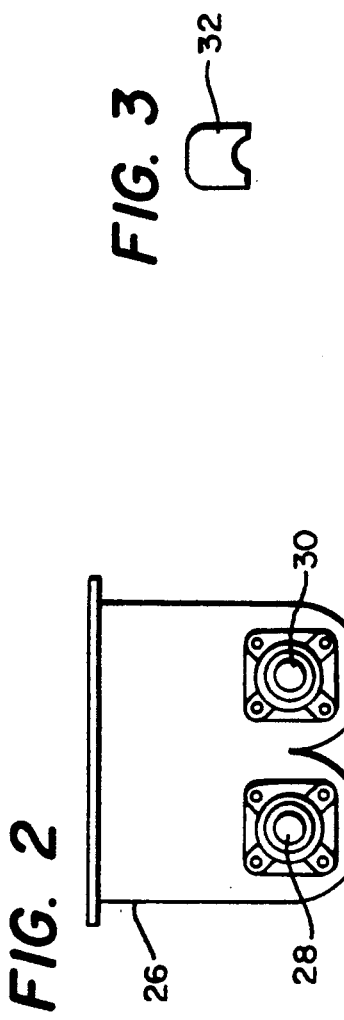
FIG. 2 is an end view of the FIG. 1 auger.
Figure 3:
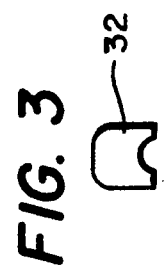
FIG. 3 is a view of a blade of the FIG. 1 auger.

The mixture is then fed from the holding bin to a material preparation auger which forms the mixture into chunks, preferably approximately the size of golf balls. With reference to the preferred material preparation auger, as illustrated in FIGS. 1-3, hot fiber/plastic mixture is fed from the heated holding bin by means of gravity through a chute into the material preparation auger 20 near its upstream end 22.

The mixture is then moved toward the downstream end 24 of the material preparation auger housing 26 by the rotation of the material preparation auger shafts 28, 30 which have a plurality of material preparation auger blades 32 attached thereto. An individual blade 32 is illustrated in FIG. 3. The shafts 28, 30 are rotated inwardly by conventional means such as a motor, not illustrated. The action of the blades on the mixture sizes the mixture into pieces approximately the size of golf balls as the material is moved toward the downstream end 24 of the material preparation auger housing 26. These pieces of mixture are discharged from the material preparation auger through the discharge opening 34 in the bottom of the material preparation auger housing near its downstream end and conveyed to the extruder.

The shafts have a plurality of blades 32 affixed thereto. The first few upstream blades 32, approximately three, on each shaft are mounted at an angle of approximately 15° to the direction of travel of the mixture. The remaining blades are mounted at an angle of approximately 30° to this direction. The material preparation auger performs the function of creating a uniformly-sized feed stock for use in downstream extruding equipment. This feed stock can be introduced into the extruder at a consistent rate to minimize surging during the extrusion process.

STEP 15

Figure 4:
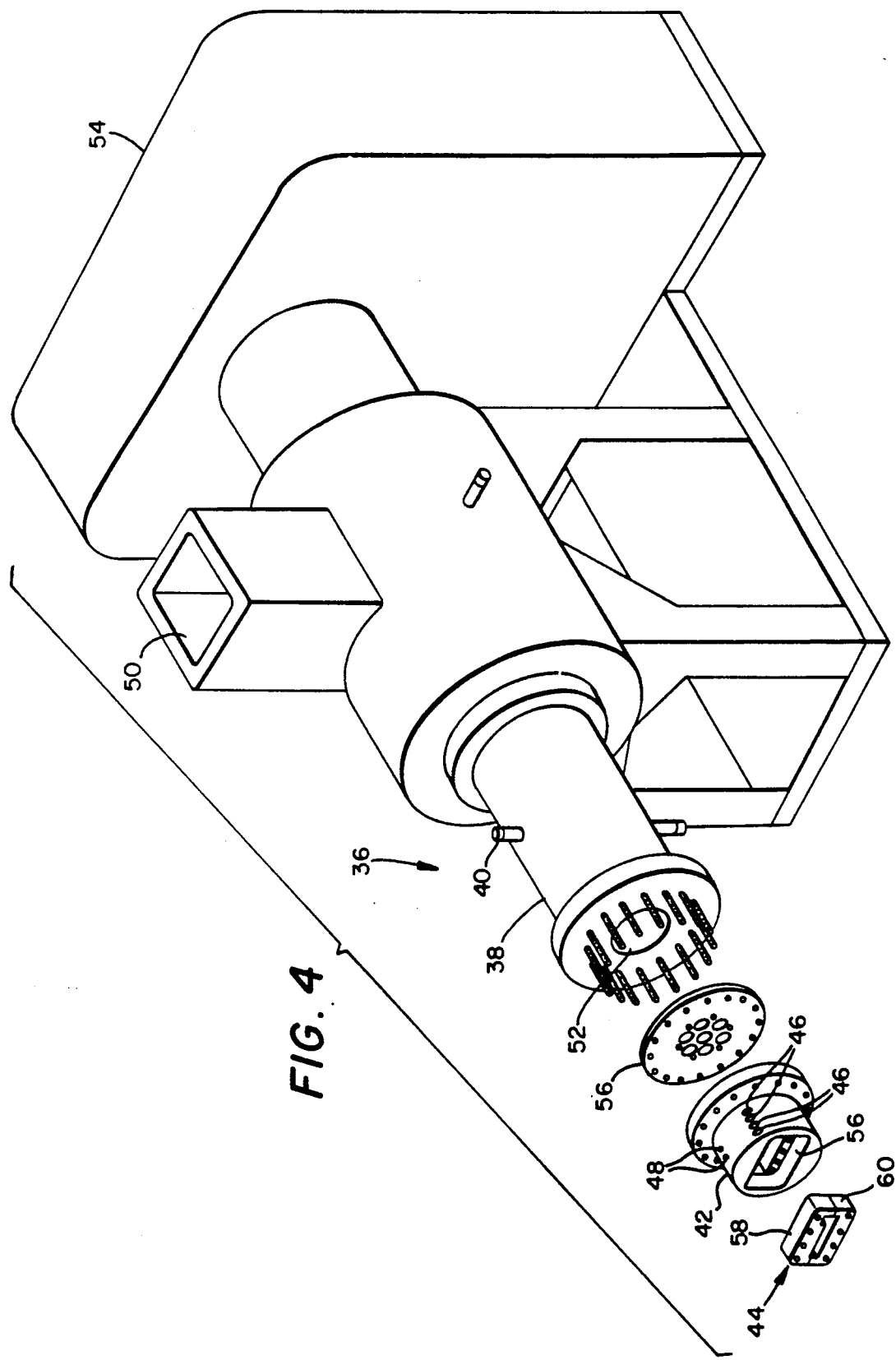
FIG. 4 is an exploded perspective view of the preferred extruder of the present invention.

The uniformly sized chunks of feed stock are then conveyed to a compounding extruder 36, as shown in FIG. 4, preferably by means of a conventional 12" diameter screw conveyor.

Although the preferred conveying means is a 12" diameter screw conveyor, it is believed that a cleated belt conveyor may be used for this purpose. It is believed that a cleated belt conveyor may be advantageous in that it will reduce residue within the conveyor which otherwise could harden and contaminate subsequent batches of malleable fiber/plastic mixture.

Although, as presently practiced, the preferred process feeds chunks of malleable material directly to an extruder 36, it is envisioned that a conventional compounding roll mill may be incorporated into the system. Prior to the extruder so that other material, such as a fire retardant, U.V. stabilizers, strength inducers, compatibilizers, engineered resins and other substances having advantageous properties may be introduced into the mixture prior to extrusion.

STEP 16

The mixture is extruded through a predetermined die and formed into a product having a predetermined configuration.

The preferred extruder 36 is a standard compounding extruder, having a barrel tapered from a 12" diameter to a 6" diameter, and powered by a 40 hp, 800 rpm electric motor. The extruder has been modified so that its barrel and screw have been shortened to 36" and it has been equipped with a water jacket 38, with port 40 for cooling the mixture during extrusion.

It has been discovered that cooling is required to prevent the mixture from becoming too hot as it is extruded due to the friction and sheer created by the mixture as it is forced through the extruder. A mixture of 55% cedar fiber and 45% LDPE should not be allowed to reach a temperature of greater than approximately 450° F. at this stage. A similar mixture with the plastic component of 60 parts LDPE and 40 parts HDPE should not be allowed to reach a temperature greater than approximately 500° F. at this stage. These mixtures have a tendency to ignite when their respective stated temperatures are exceeded.

With reference to FIG. 4, the extruder 36 is equipped with a bolster 42 and interchangeable dies, one of which, die 44, is shown, whereby the product profile configuration may be changed upon changing the dies. The bolster 42 which holds the die is equipped with electrical heating elements not shown, which pass through ports 46 for use in heating the die during extrusion. It is important that the surface temperature of the mixture must be sufficiently high at the point where the mixture exits the extruder 36 to create a uniform surface for the extruded product. If proper surface temperature is not maintained, the surface of the mixture may tear as it exits the extruder die.

In some cases additional heat is required at the dies and this additional heat is provided by the heating elements on the bolster. The preferred surface temperature at the exit of the extruder is approximately 425°–450° F. for a 55% cedar fiber/45% LDPE mixture and 450°–475° F. for a similar mixture with a plastic component of 60 parts LDPE and 40 parts HDPE. Temperature sensors are placed inside the bolster through ports 48.

During operation of the extruder 36, fiber/plastic mixture is introduced into the mixture inlet 50 of the extruder 36.

The mixture is forced through the extruder barrel outlet 52 by means of a conventional screw mechanism within the extruder driven by a conventional motor and gear mechanism, not shown, within the motor and gear housing 54.

The mixture exits the extruder barrel through the extruder barrel outlet 52. The extruder housing and extruder barrel are water jacketed for cooling as shown at 38.

As the mixture exits the extruder barrel it is forced, in turn, through the fiber alignment plate 56, the extruder bolster 42 and then the extruder die 44. The fiber alignment plate 56 has the configuration shown in FIG. 4 so that it will function to straighten out and align the mixture for passage through the bolster 42 and die 44. It has been found that without the fiber alignment plate 56, tis mixture has a tendency to retain the orientation given it by the extruder screw and not maintain proper alignment as it passes through the die.

The fiber alignment plate 56 configuration shown is the preferred configuration for extrusion of a 55% cedar fiber/45% LPDE mixture, as well as a similar mixture with the plastic component thereof comprised of 60 parts LPDE and 40 parts HDPE. It is envisioned that the fiber alignment plate configuration may be varied for other fiber/plastic formulations.

The bolster 42 holds and supports interchangeable dies 44 for the extrusion of desired products having different profiles or configurations. The bolster 42 also has heating element ports 46 for the insertion of heating elements, not shown, so that the mixture may be heated as it exits the die 44. These heating element ports 46 are preferably provided so that separate heating elements may be inserted and controlled proximate the top, bottom and both sides of the die to facilitate uniform heating of the die.

The bolster is also provided with temperature sensor ports 48 for the insertion of temperature sensors, such as conventional thermocouples, so that the temperature of the bolster may be monitored and controlled.

The extruder die 44 is affixed within a recess 56 in the downstream end of the bolster. The die 44 shown forms the mixture into an L-shaped configuration as the mixture is forced therethrough. The die is preferably comprised of two separate components, a top half 58 and a bottom half 60 for ease of insertion into and extraction from the extruder bolster 42.

STEP 17

Figure 5:
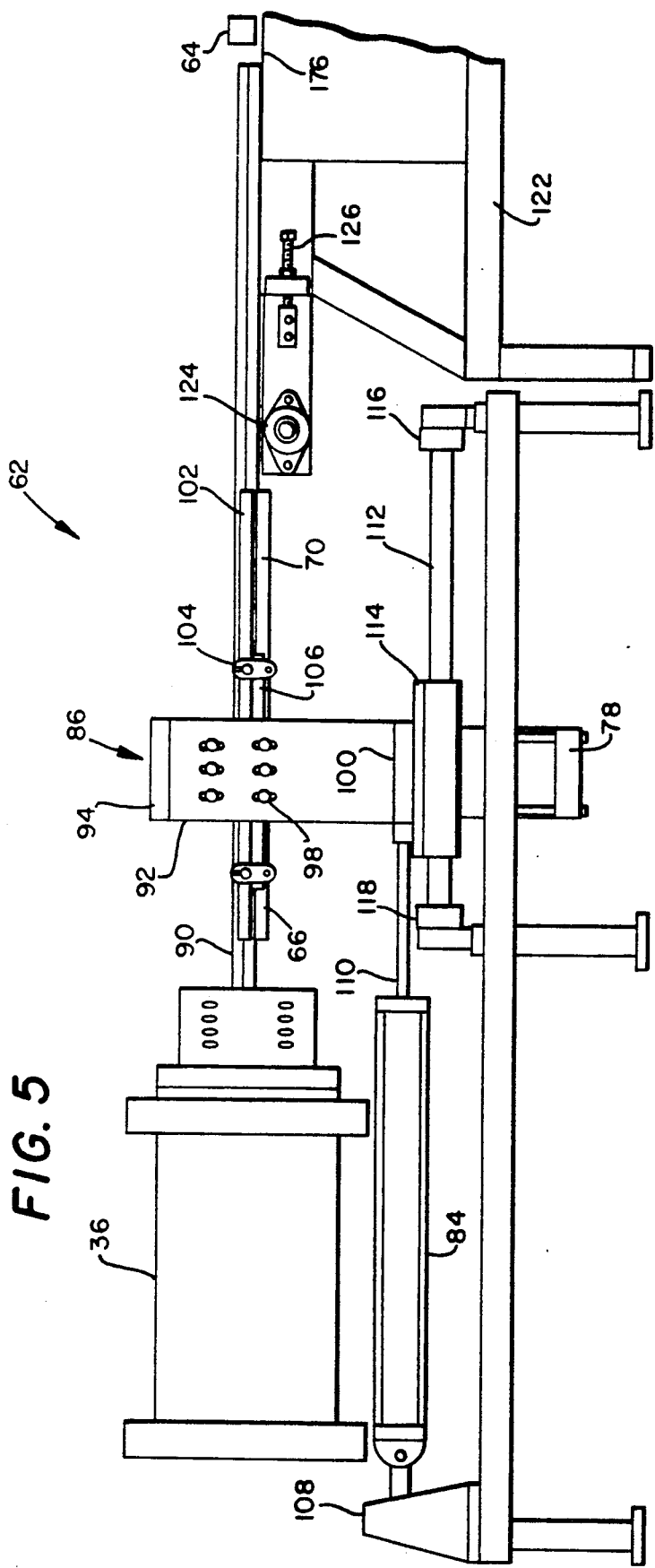
FIG. 5 is a side view of the preferred flying cutoff assembly of the present invention.

The extruded product is cut into desired lengths as it exits the extruder 36. The cutting operation is performed by a custom flying cutoff assembly 62 as shown in FIG. 5–7, equipped with an electric eye sensing device 64.

As product 90 is forced out of the extruder 36, it slides continuously and successively onto and across the entry tray 66 of the flying cutoff knife assembly 62, the product support plate 68 of said assembly, and the exit tray 70 of said assembly. The product then slides onto the conveyor belt 72 of the inspection table assembly 74.

An adjustable electric eye sensing device 64 is provided on the inspection table 76 so that when a leading edge of product is sensed by the device 64, a signal is transmitted to a processor which activates the two air cylinders, 78, 84 as further described. Assuming that the knife 80 of the flying cutoff knife assembly is in the down position, is shown in FIG. 6, the air cylinder 78 attached to the knife is activated to move upwardly so that the product is severed by the upper cutting edge 82 of the steel knife 80. Simultaneously, the horizontal air cylinder 84 of the assembly 62 is activated to move the flying cutoff knife housing in the direction of the flow of product at the same speed at which the product is moving. This allows the product to be cut into pieces while it is continuously flowing from the extruder without the piece of product on the upstream side of the knife blade ramming into the blade as a cut is being effectuated.

Once a cut is completed, the piston of the horizontal air cylinder 84 retracts, returning the flying cutoff knife housing 86 to its starting position.

As is shown in the end view drawings, FIGS. 6 and 7, a product opening 88 is provided in the flying cutoff knife 80 so that product can continue, to flow through the flying cutoff knife housing while the knife is in its up position. When the knife is in such up position as shown in FIG. 7, the next product cut is made by the lower cutting edge 90 of the knife 80 when the void between the trailing edge of the most recently cut piece of product and the immediately following leading edge of the product stream is sensed by the sensing device 64 and the attached processor activates the air cylinder 78 attached to the knife 80 to return the knife 80 to its down position shown in FIG. 6. Of course, at the same time, the processor activates the horizontal air cylinder 84 to move the flying cutoff knife housing 86 as described above for the upward stroke of the knife 80.

This procedure is then continued for as many product cuts as desired.

As also shown in FIG. 5, product 92 is shown positioned within the flying cutoff knife assembly 62 and on inspection table 76. The assembly 62 has a housing 86, side frame 92, top frame 94, product stop block screw 96, product support plate screw 98, and bottom frame 100. Product guide 102 is positioned to guide the product 90 and has guide rod holder 104 and guide rod holder support 106 connected thereto. Cylinder 84 is mounted at mount 108 and has piston 110. The assembly 62 is movable along shaft 112 on linear ball cage bearing 114 between urethane bumpers 116, 118. The inspection table assembly 122 includes the table 76, conveyor belt roller 124, and belt tensioner 126.

Referring to FIGS. 6 and 7, the piston 128 for cylinder 78 is shown in FIG. 7. Shown in FIG. 6 is product support plate 130 and adjustable product guide rod 132, product guide 134, with metal brace, made of UHMW plastic or Teflon coated material. Also shown is blade guide 136, product stop block 136, guide clamp 138, product exit tray 140, knife holder 142, shaft support 144, horizontal support frame 146, back stop plate 148, leg 150 and base 152.

With regard to the operation of the flying cutoff knife the following items should be noted:

(a) Preferably the product guides 134 and the product entry tray 66 and exit tray 140 are constructed of UHMW plastic or Teflon coated material to facilitate the sliding of the product thereacross.

(b) The exit port of the extruder 120 is aligned with the entry tray 66, support plate and exit tray 140 of the knife housing assembly which are in turn aligned with the top of the inspection table 76 so that the product moves in a straight line.

(c) The product stop block 136 holds the product 90 in place as the knife is moved upwardly through the product. It has been found that this is desirable since at the cutting stage the product is pliable and has a tendency to bend as it is being cut. The product support plate 130 performs the same function when the knife is cutting in the downward direction.

(d) The product support plate 130 has a slot therein to allow for passage of the knife therethrough.

(e) The speed at which the flying cutoff knife housing 86 moves horizontally is adjustable so that varying speeds of product flow can be accommodated.

(f) The electric eye sensor 64 on the inspection table 76 is adjustable so that the lengths of the product being cut may be varied as desired.

(g) The speed of the conveyor belt on the inspection table is preferably maintained at a speed approximately 15% faster than the flow rate of the product so that cut pieces cf product will be moved away from the product stream at a rate faster than the flow rate of the product stream itself.

(h) An activation switch, not shown, preferably provided on a foot pedal, is provided to allow a person at the inspection table to cut product before it reaches a pre-set length. This allows for a shorter length of product to be rejected if a defect is noticed in the product thereby reducing waste from the process.

STEP 18

The cut lengths of hot product 90 are then conveyed by conventional means, such as a belt conveyor, across an inspection table and sent to a custom rolling and cooling conveyor.

At the inspection table, any reject material is removed from the process.

STEP 19

Acceptable, hot extruded product 90 is then passed through an adjustable, variable speed rolling and cooling conveyor 154, as illustrated in FIGS. 8-13. The rolling and cooling conveyor 154 functions to maintain the profile configuration of the lengths of hot, extruded product 90 in their predetermined configuration so as to avoid deformation upon cooling. The guides 156 and rollers 158 of the rolling and cooling conveyor 154 may be adjusted to accommodate different product configurations. Of importance in the particular application of the present invention, the pressure exerted by the rolling and cooling conveyor on the hot, extruded product 90 is held to a minimum so that the hot product will cool and contract substantially independently of pressure exerted by the conveyor. It has been found that if pressure is exerted on the product at this stage by the conveyor, stresses can be induced into the product and the final product weakened.

Figure 9:
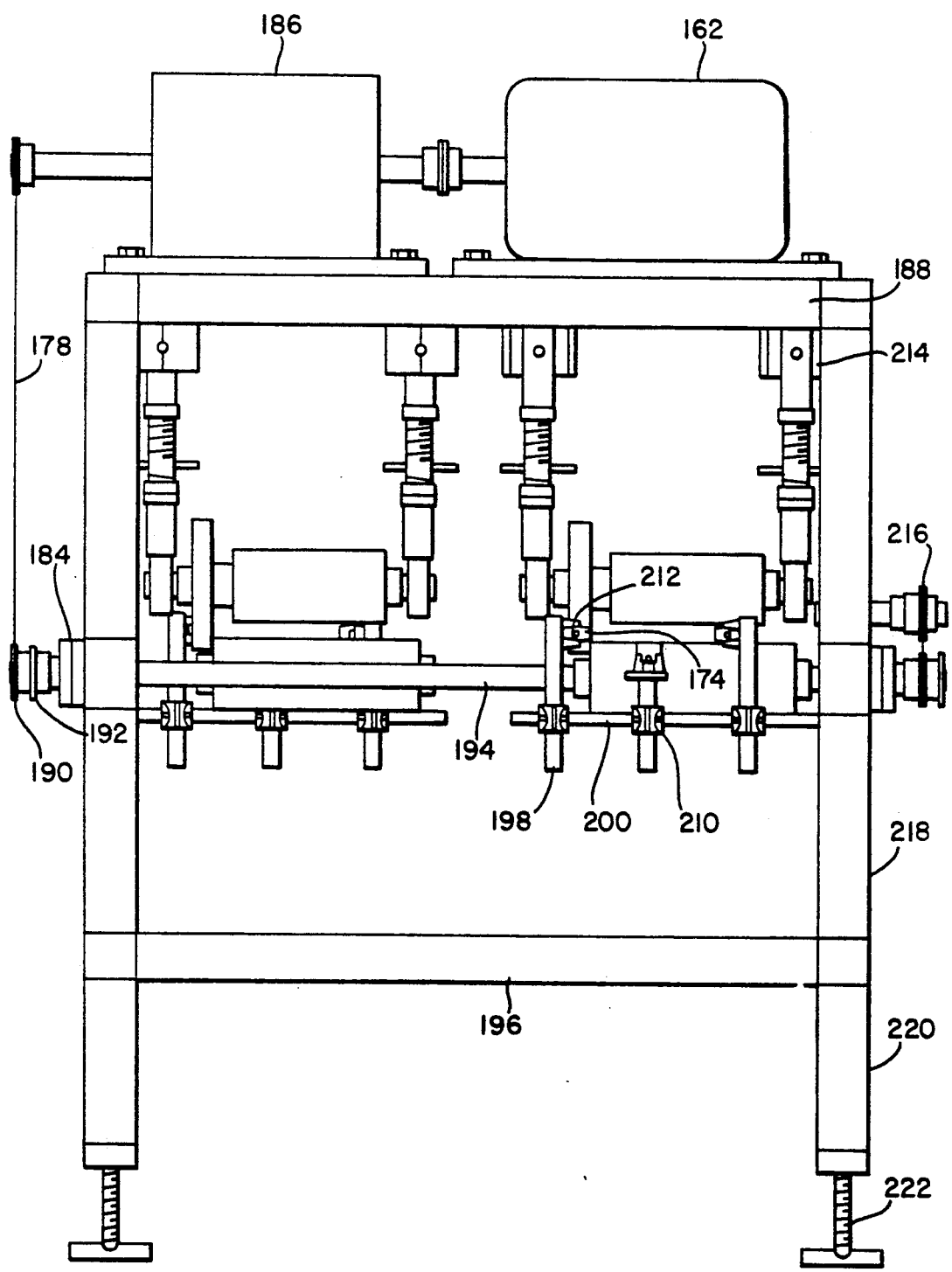
FIG. 9 is an end view of the FIG. 8 conveyor.

Referring to FIGS. 7-9, operation of the rolling and cooling conveyor will be described. The product is conveyed from the inspection table 122 to the first set of rollers 158 of the rolling and cooling conveyor 122. The bottom rollers 160 of the conveyor are turned by a chain drive mechanism powered by a conventional power source, preferably a variable speed electric motor 162.

The bottom rollers 160 convey the product through the conveyor assembly for a distance sufficient to allow the product to cool to a temperature at which the product is adequately cured for handling, i.e., less than 180° F. The speed of the rollers may be varied to conform with the speed of the conveyor belt on the inspection table so that a continuous flow of product pieces may be maintained. The distance of conveyor travel for adequate cooling varies with atmospheric conditions, speed of the rollers and configuration of the product. In practice, it is preferred to provide for excess travel so that one is assured that the product has adequately cooled. For an L-shaped product configuration made up of 1.5 lbs./ft. of mixture, it has been found that 200 feet of travel at a roller speed of 30 ft./min. is sufficient for adequate cooling.

The side view FIG. 8 of a section of the rolling and cooling conveyor shows ten roller assemblies. Counting from left to right, the first, third, fifth, seventh and ninth roller assemblies move the product pieces in a rightwardly direction. As will be explained, the direction of the product pieces is reversed and the tenth, eighth, sixth, fourth and second roller assemblies move the product pieces in the leftwardly direction.

To reverse the direction of the pieces of product, a reversing table 164 is provided as shown in FIGS. 10 and 11. The reversing table 164 is equipped with powered rollers 166 as shown in the side and top views of FIGS. 11 and 10, respectively, as well as an electric eye sensing device 168 and a product ram 170. When the device senses a product piece which is being conveyed in the rightwardly direction in FIG. 10, a signal is transmitted to a processor which activates the air cylinders 172 of the product ram 170 which extends to push the product pieces onto opposite, flanged rollers which move the product pieces in the opposite direction.

Sections of conveyor and reversing tables may be assembled as required in an area which would not accommodate a straight-line conveyor to provide enough conveying distance for proper product cooling.

Once cooled, the product pieces exit the last section of the conveyor for further processing or shipment.

With regard to the operation of the rolling and cooling conveyor, the following items should be noted:

(a) The roller assemblies are adjustable to accommodate product pieces of differing thickness. Also, the rollers may be interchanged to accommodate product pieces having different configurations.

(b) The conveyor is equipped with product guides 174 to facilitate proper alignment of the product pieces as they are being conveyed. The product guides are preferably constructed of UHMW or Teflon coated material to reduce frictional resistance between the product pieces and guides as they come in contact during the movement of the product pieces.

Figure 12:
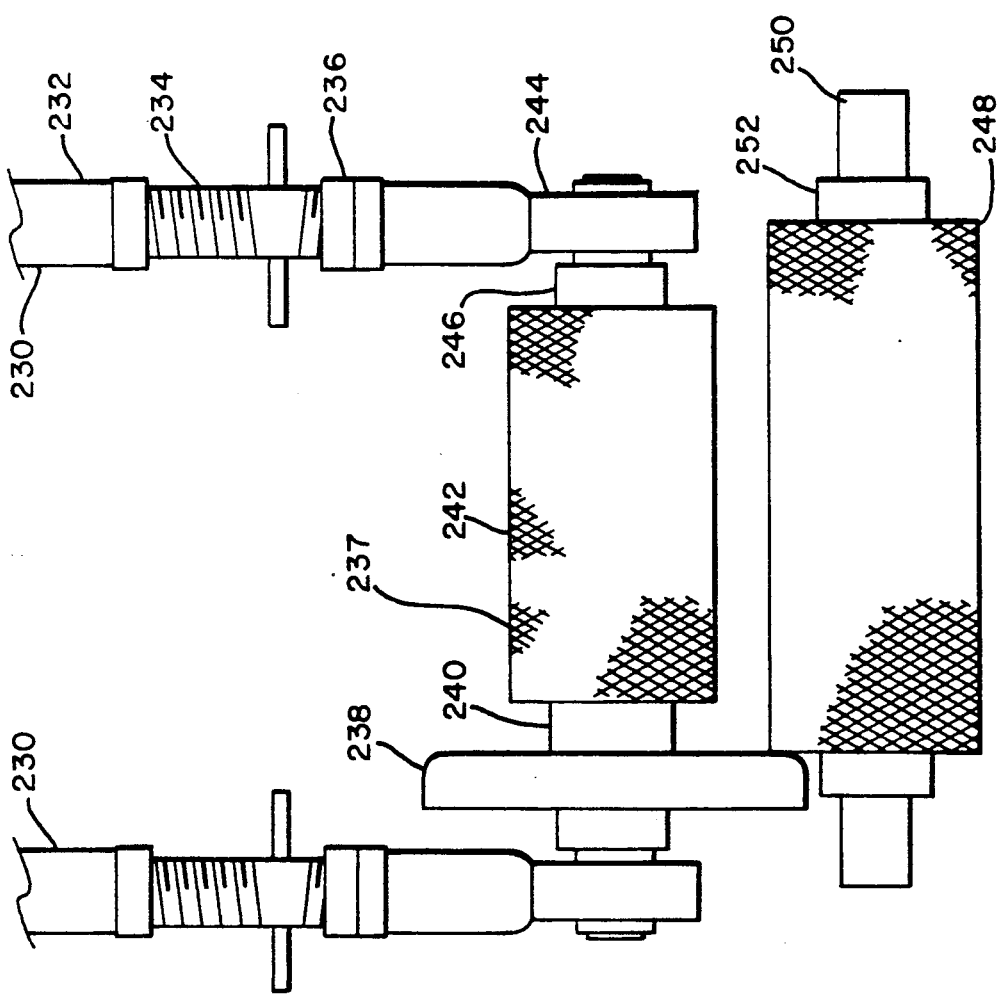
FIG. 12 is a front view of a preferred roller assembly of the present invention.

(c) The rollers are knurled, as shown in FIG. 12, preferably with a coarse, knurled pattern. It has been found that this makes the rollers self-cleaning and reduces the amount of contact surface between the product pieces and the rollers, thereby facilitating the cooling of the product pieces.

Referring to FIG. 8, the conveyor 154 is shown having chain drive 178, idler sprocket 180, idler sprocket mount 182 and support bearing 184.

Referring to FIG. 9, the conveyor 156 has gear box 186, chain 178, shaft support bearing 184, drive sprocket 190, driven sprocket 192, bottom frame 196, shaft 194, guide rod 198, guide rod holder support 200, guide rod holder 210, guide clamp 212, product guide 174, bracket 214, idler sprocket 216, side frame 218, leg 220, and adjustable pad 222.

Referring to FIGS. 10 and 11, the reversing table 164 is also shown having air cylinder 172, electric eye sensor 168, ram 170, drive chain 224, bottom frame slat 226, and ram guide rod 228.

Figure 13:
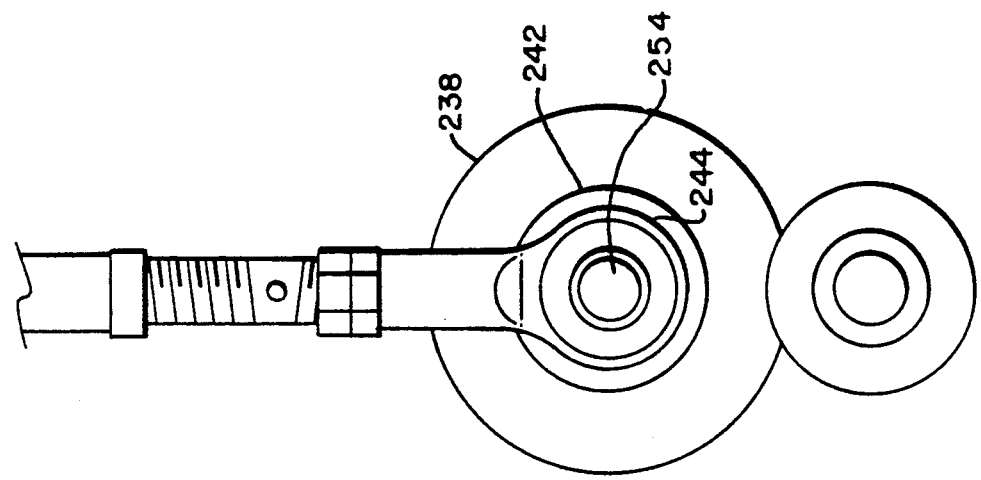
FIG. 13 is a side view of the roller assembly of FIG. 12.

Referring to FIGS. 12 and 13, the roller assembly is also shown as including adjustable top roller supports 230 having threaded adjustable sleeves 232, adjusting screws 234 and lock nuts 236. The top rollers 237 are provided with top roller flanges 238, top roller sizing segments 240, and top roller knurl sections 242. Roller bearing 244 and roller locking collars 246 also support rollers 237. Bottom knurled rollers 248 are supported on shafts 250 and have locking collars 252 positioned as shown. Top rollers 237 rotate around shafts 254 as shown in FIG. 13.

STEP 20

After cooling, the lengths of product are collected and assembled for shipment or further processing, such as sawing, machining, painting and forming into desired products such as previously mentioned. Such further processing may also include milling and finishing operations for purposes such as smoothing the surface areas of the lengths and adding features such as grooves and/or slots to the product.

EXAMPLES

In accordance with the above described process steps, the following examples are set forth below to illustrate specific processes, specific starting materials, specific processing parameters and specific blends of plastic/wood starting materials.

EXAMPLE 1

In accordance with the steps outlined above, a 1000 lb. batch of mixture having 550 lbs. of cedar fiber of an 8% moisture content and 450 lbs. of LDPE plastic was made.

This mixture was dumped and conveyed to a compounding machine in which the hot oil jacket temperature was approximately 475° F. The initial inside wall temperature of the compounding machine was approximately 410° F. The mixture was kept in the compounding machine for approximately 1 hour and then transferred to a heated holding bin. The surface temperature of the material at the time it was transferred to the holding bin was approximately 310° F.

The mixture was processed through the material preparation auger and then transferred to the extruder and extruded into a product having an L-shaped configuration as shown in FIG. 4. In this particular example, the configuration resulted in a product yield of one and one-half lbs. per foot of extruded product. The speed of the extruder was set at approximately 25 lbs. per minute. The barrel of the extruder was cooled by means of a water jacket so that the temperature of the barrel did not exceed approximately 250° F. The extruder pressure was maintained at approximately 500 psi. The extruder die temperature was maintained at approximately 725° F. by means of the electrical heating elements in the die bolster. The surface temperature of the mixture as it exited from the extruder was approximately 430° F.

After exiting the extruder, the hot product was then cut into lengths of 5 feet, inspected and then passed through the rolling and cooling conveyor equipment where it was cooled to room temperature.

EXAMPLE 2

In accordance with the steps outlined above, a 1000 lb. batch of mixture having 550 lbs. of cedar fiber of a 7% moisture content and 450 lbs. of a plastic blend comprising 270 lbs. of LDPE and 180 lbs. of HDPE was made.

This mixture was dumped and conveyed to a compounding machine in which the hot oil jacket temperature was approximately 475° F. The initial inside wall temperature of the compounding machine was approximately 410° F. The mixture was kept in the compounding machine for approximately 1½ hours and then transferred to a heated holding bin. The surface temperature of the material at the time it was transferred to the holding bin was approximately 350° F.

The mixture was processed through the material preparation auger then transferred to the extruder and extruded into a product having an L-shaped configuration as shown in FIG. 4. In this particular example, the configuration resulted in a product yield of one and one half lbs. per foot of extruded product. The speed of the extruder was set at approximately 25 lbs. per minute. The barrel of the extruder was cooled by means of a water jacket so that the temperature of the barrel did not exceed approximately 250° F. The extruder pressure was maintained at approximately 500 psi. The extruder die temperature was maintained at approximately 725° F. by means of the electrical heating elements in the die bolster. The surface temperature of the mixture as it exited from the extruder was approximately 450° F.

After exiting the extruder, the hot product was then cut into lengths of 5 feet, inspected and then passed through the rolling and cooling equipment where it was cooled to room temperature.

VARIATIONS IN PROCESSING STEPS

There may be some variation in the process depending on a number of circumstances. For example, if the extruder die is changed to produce a product profile having an increased yield in terms of lbs. per foot, the rolling and cooling conveyor equipment downstream must be adjusted, that is, its speed must be reduced to accommodate a slower through-put in terms of feet per minute of product, assuming that the extruder speed is held constant. On the other hand, with a constant extruder speed, if a die is chosen so that the yield is fewer lbs. per foot, then the speed of the downstream equipment must be increased correspondingly.

It is envisioned that numerous alternate processing steps and alternate embodiments of the present invention may be envisioned by one of ordinary skill in the art. It is intended that all such alternatives and alternate embodiments are included within the scope of the present invention which is defined by the hereby appended claims.

We claim:

1. A conveyor having a plurality of upper roller assemblies, a plurality of lower roller assemblies, and means for rotating the lower rollers at a desired speed, each upper roller assembly further comprising a transverse shaft rotatably mounted at each end thereof in a bearing member supported by an adjustable roller support member having upper and lower ends; each adjustable roller support member comprising the lower end releasably connected to the bearing member, and threaded means for selectively adjusting the distance between the upper and lower ends; and at least one roller disposed on the shaft.

2. The conveyor of claim 1 wherein each lower roller assembly comprises at least one roller and each upper roller assembly comprises at least one roller selectively spaced a desired distance above at least one roller of each lower roller assembly.

3. The conveyor of claim 2 wherein at least one roller of each upper roller assembly has a roller flange having a diameter greater than the distance between the shaft and at least one roller of each lower roller assembly.

4. The conveyor of claim 1 wherein each adjustable roller support member comprises a locking means for the threaded adjustment means.

* * * * *